United States Patent [19]

Perkins

[11] Patent Number: 5,362,221

[45] Date of Patent: Nov. 8, 1994

[54] MANUFACTURING DEVICE WITH AN AUTOMATIC SELF-ALIGNING CONNECTOR FOR ATTACHMENT TO A DOCKING STATION

[75] Inventor: Dennis G. Perkins, Albuquerque, N. Mex.

[73] Assignee: General Electric Company, Cincinnati, Ohio

[21] Appl. No.: 930,260

[22] Filed: Aug. 17, 1992

[51] Int. Cl.$^5$ ............................................. B29C 33/34
[52] U.S. Cl. .................................... 425/62; 414/222; 425/185; 425/DIG. 13
[58] Field of Search ............... 425/62, 138, 185, 186, 425/DIG. 13, DIG. 110, DIG. 246; 414/222; 100/229 R, 918

[56] References Cited

U.S. PATENT DOCUMENTS

| | | | |
|---|---|---|---|
| 3,059,274 | 10/1962 | Fassero et al. | 425/62 X |
| 3,316,834 | 5/1967 | Draganti | 100/229 R X |
| 3,545,044 | 12/1970 | Rebovich et al. | 425/186 X |
| 3,558,095 | 1/1971 | McNiel | 425/62 X |
| 3,841,142 | 10/1974 | Aisuta et al. | 100/918 X |
| 4,911,632 | 3/1990 | Mansfield | 425/185 X |
| 5,006,056 | 4/1991 | Mainstone et al. | 425/186 |
| 5,040,965 | 8/1991 | Baird | 425/186 |
| 5,129,254 | 7/1992 | Keizer et al. | 100/229 R X |
| 5,256,053 | 10/1993 | Haguchi | 425/186 |

*Primary Examiner*—Richard L. Chiesa
*Attorney, Agent, or Firm*—Jerome C. Squillaro; Bernard E. Shay

[57] ABSTRACT

A manufacturing device is disclosed which has a connector which automatically self-aligns with a mating connector of a docking station. The device includes a receptacle for receiving and holding an unfinished workpiece. At least one connector is provided for coupling the receptacle to at least one process input, such as electrical energy, pneumatics, hydraulics or the like, via the docking station, and an alignment mechanism is provided for automatically aligning the connector for attachment to a mating connector on the docking station when the receptacle is advanced toward the docking station.

5 Claims, 8 Drawing Sheets

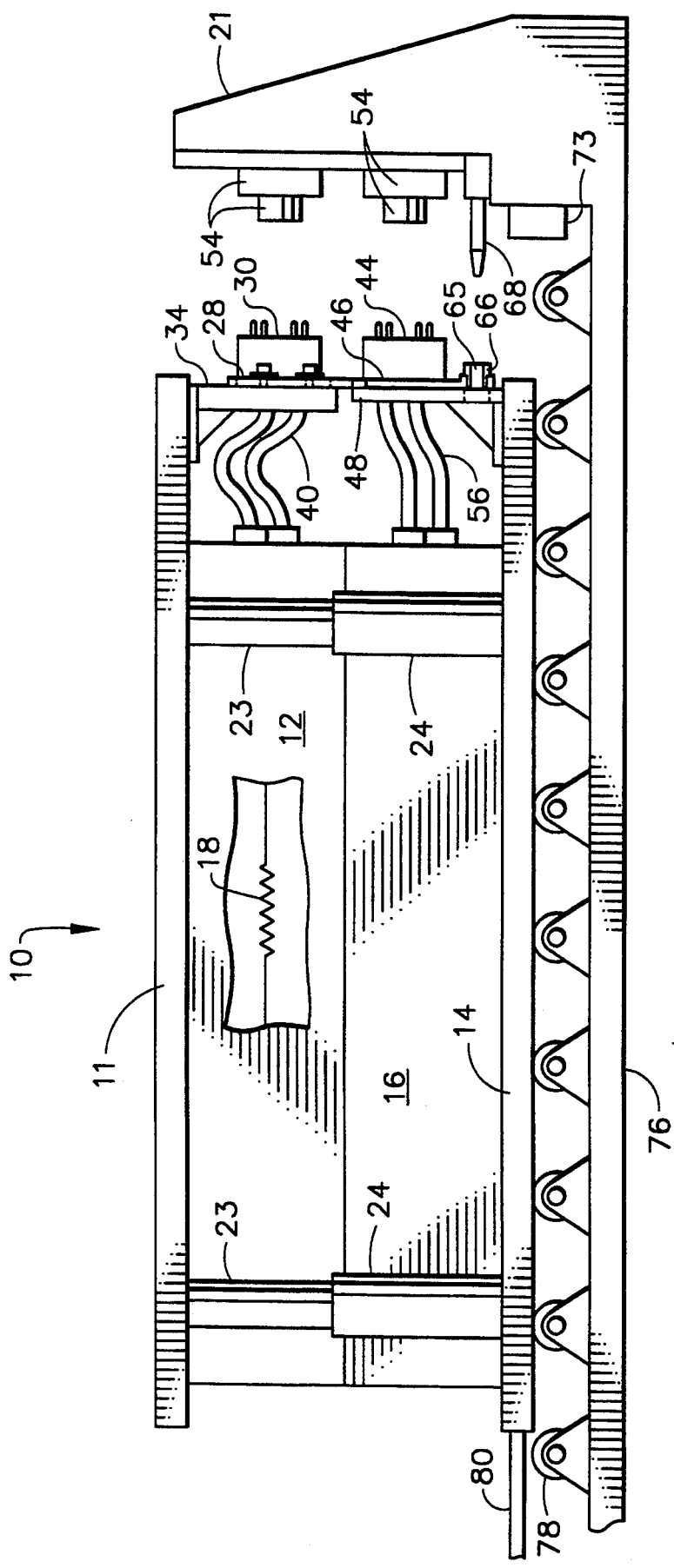

MANUFACTURING DEVICE WITH AN AUTOMATIC SELF-ALIGNING CONNECTOR FOR ATTACHMENT TO A DOCKING STATION

BACKGROUND OF THE INVENTION

The present invention relates to manufacturing devices for holding a workpiece and moving the workpiece to a docking station where a manufacturing operation is performed on the workpiece, and more particularly, to a novel die mold manufacturing device with electrical connectors capable of automatically self-aligning for coupling to mating connectors on a pre-heat station or docking station.

In automated manufacturing systems, it is often necessary to move a workpiece to different stations where different operations may be performed on the workpiece. An important consideration, particularly where these different work stations may present a hazardous or harmful environment to a system operator or to delicate electronic devices or the like for controlling the manufacturing process, is the need for an arrangement for automatically connecting a transportation device, such as a die mold or the like, to an external source of energy, such as electricity, air, pneumatics, hydraulics or the like and automatic connection to devices or mechanisms for controlling the application of these process inputs. For example, an integrally electrically heated die mold requires electrical connection to the internal electrical resistive heating elements of each die mold portion from an external source of electrical power and also electrical connection to the heating control thermocouples in each mold portion for thermostatically controlling the heating of each die mold portion. The source of electrical power and the control devices for controlling the heating of the die mold portions are of necessity located remotely to the die mold portions because of the high heat which could damage these system components.

Additionally, interconnection of these energy sources and control devices to the manufacturing apparatus or die mold can limit access of a system operator, such as for example, access for removing a workpiece from a die mold or preparing a die mold for molding of a subsequent workpiece.

SUMMARY OF THE INVENTION

It is, accordingly, a primary object of the present invention to provide a novel die mold manufacturing system which is not subject to the foregoing disadvantages.

It is another object of the present invention to provide a die mold with automatic self-aligning connectors for connection to external sources of energy and control devices.

It is a further object of the present invention to provide a novel die mold which per,nits substantially complete access to the die mold by a system operator.

In accordance with the present invention, a manufacturing device for holding an unfinished workpiece and transporting the workpiece to a docking station for performance of a manufacturing operation on the workpiece includes a receptacle for receiving and holding the unfinished workpiece. A connector is provided to couple the receptacle to at least one source or process input, such as electrical power, pneumatics, hydraulics or the like, by way of the docking station. An alignment arrangement automatically aligns the connector, without the need for operator intervention, for attachment of the connector to a mating connector on the docking station when the receptacle is advanced toward the docking station.

In accordance with an embodiment of the present invention, a die mold manufacturing device with an automatic self-aligning connector includes an upper die adapter plate or frame member and an upper die half attached to the upper adapter plate. A lower die adapter plate or lower frame member has a lower die half attached thereto with the lower die half being juxtaposed to the upper die half. The die mold device may be positioned at a die separator station for moving the upper die half between a first or non-operating position at a spacing from the lower die half for access to the mold and a second or operating position for docking to a pre-heat station and molding a workpiece in cooperation with the lower die half. An upper electrical connector means is provided for electrically connecting the upper die half to the docking or pre-heat station when the upper die half is in its second position, and a lower electrical connector means is provided for electrically connecting the lower die half to the pre-heat station when the upper die half is in its second position. The die mold further includes an alignment mechanism for aligning the upper connector means and the lower connector means with respective upper and lower mating connector means on the pre-heat station for interconnection of the respective connector means to supply electrical power to the die halves for internal heating thereof during a molding process and to also preferably provide connection to heating control means. The upper electrical connector means is movably mounted in relation to the upper die adapter plate and upper die half and the lower electrical connector means is movably mounted in relation to the lower die adapter plate and the lower die half to permit the upper and lower electrical connector means to move with respect to the die halves for alignment and interconnection with the mating connector means of the pre-heat station. Additionally, the upper connector means and the lower connector means are preferably interconnected with each other by an interlocking arrangement when the upper die mold half is in its second position to provide coordinated movement of the upper and lower connector means for alignment and connection to their respective mating connector means on the pre-heat or docking station.

These and other objects of the present invention, together with the features and advantages thereof, will become apparent from the following specification when read with the accompanying drawings.

BRIEF DESCRIPTION OF THE DRAWINGS

FIG. 2B is a side elevation view of the die mold and pre-heat station with the die mold halves in an operating position to mold a workpiece before interconnection to the pre-heat station.

DETAILED DESCRIPTION OF THE PREFERRED EMBODIMENT

Figure 1:
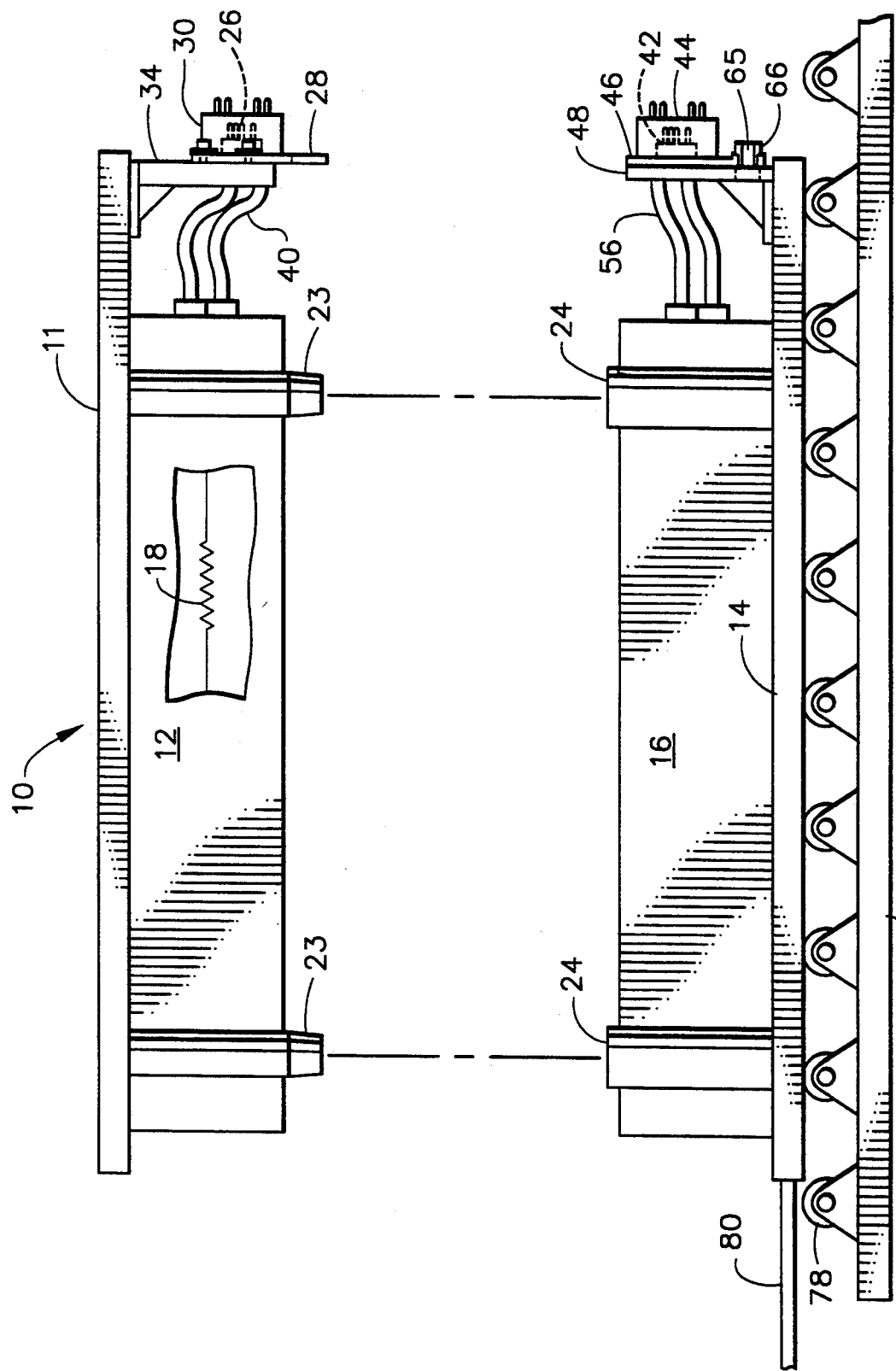
FIG. 1 is a side elevation view of the die mold manufacturing device in accordance with the present invention with the die mold halves spaced from each other in a non-operating position for operator access.

Referring initially to FIG. 1, the die mold 10 of the present invention includes an upper die adapter plate 11 or upper frame member to which is attached an upper die mold half 12 and a lower die adapter plate 14 or lower frame member to which is attached a lower die mold half 16. Differently shaped upper and lower die mold halves 12 and 16 my be respectively attached to the upper and lower adapter plates 11 and 14 depending upon the shape of the workpiece or charge (not shown) to be molded. The upper and lower die mold halves 12 and 16 each have a plurality of electrical resistive heating elements 18 mounted at selected locations within the die mold halves depending upon the shape of the workpiece to be molded and the desired distribution of heat energy necessary to mold the particular workpiece.

Figure 2A:
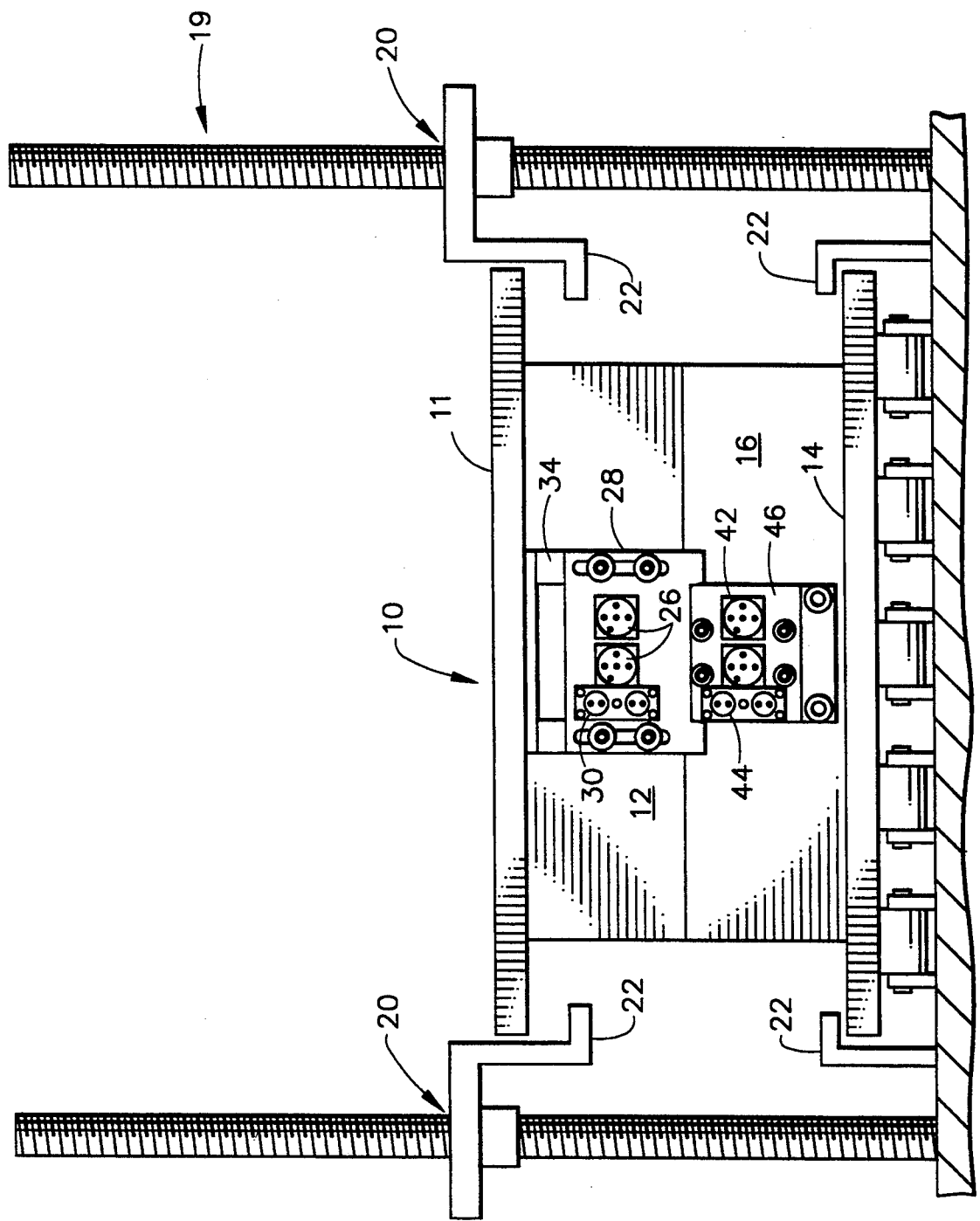
FIG. 2A is an end elevation view of the die mold positioned in a die separator station.

As best shown in FIG. 2A, the die mold 10 is positioned at a die separator station 19 to permit movement of the die mold halves 12 and 16 between a first or non-operating position, as shown in FIG. 1 at a spacing from each other to permit operator access to the interior of the die mold halves 12 and 16, and a second or operating position, as shown in FIGS. 2A and 2B, wherein die mold halves 12 and 16 are moved toward each other for docking to a pre-heat or docking station 21 (FIG. 2B) and to cooperate in molding a workpiece received and held between the die mold halves 12 and 16. The die separator station 19 may include four ball screw and nut combinations 20 which are each positioned at the opposite corners of the die mold 10. Flanges 22 hook over the upper and lower die adapter plates 11 and 14 to facilitate movement of the die mold halves between the first and second positions. A plurality of alignment pins 23 are mounted to upper die adapter plate 11 and a plurality of guide bushings 24 are mounted to lower die adapter plate 14 to receive alignment pins 23 when the upper die mold half 12 is moved to its second or operating position to cooperate with lower die mold half 16 to mold a workpiece or charge.

Figure 4:
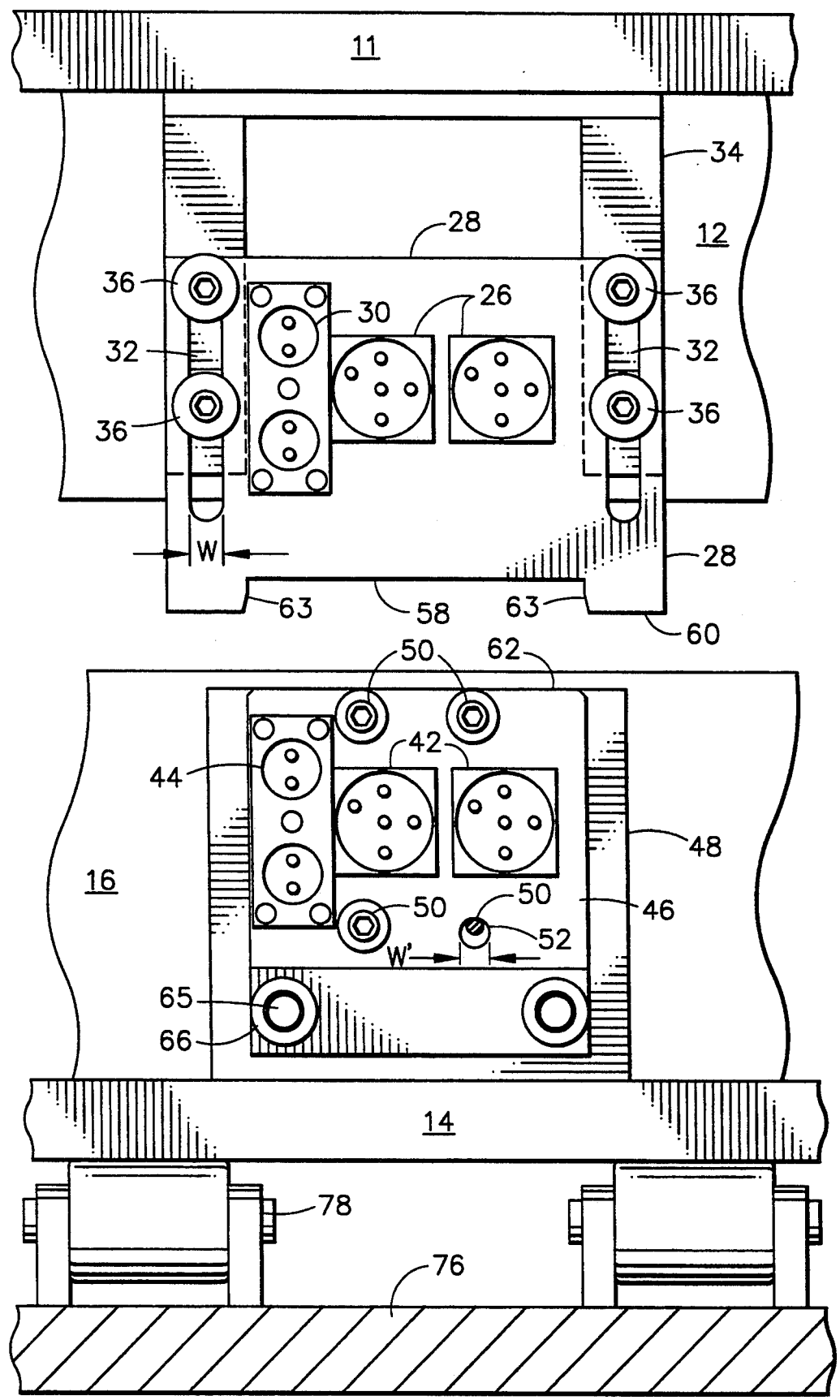
FIG. 4 is a detailed end elevation view of the die mold connectors in accordance with the present invention in a non-operating position at a spacing from each other.

In accordance with the present invention, an upper electrical connector 26, such as an electrical plug as shown in the figures, is mounted to a mounting plate 28. As shown in FIG. 4, a plurality of electrical plugs 26 may be required depending upon the number of heating elements 18 and the distribution of the heating elements within upper die mold half 12. Thermocouple connectors 30 are also provided to permit connection to thermocouples (not shown) mounted within upper die mold half 12 to permit control of the electrical heating of the upper die mold half 12.

Figure 3:
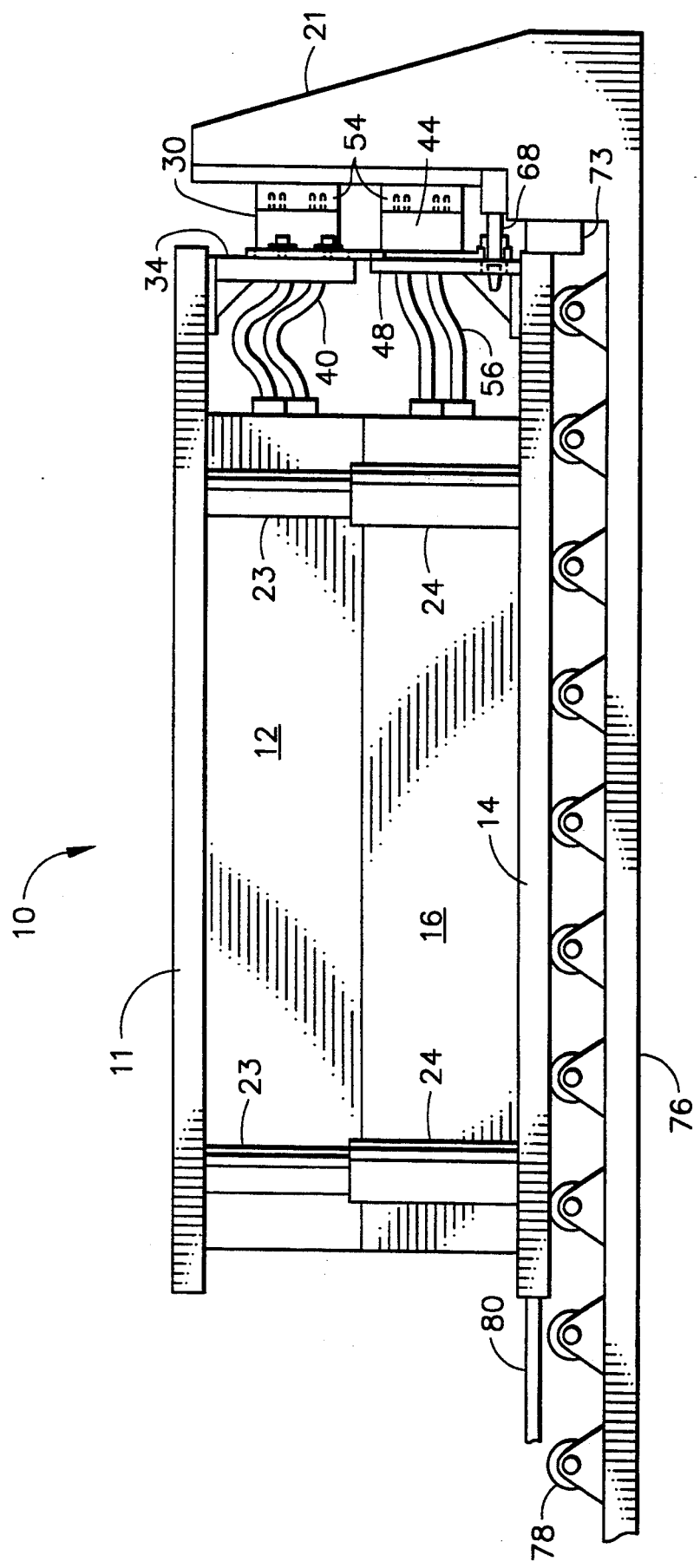
FIG. 3 is a side elevation view of the die mold in a docked position with the pre-heat station.

In accordance with the present invention, as shown in FIG. 4, a pair 32 of elongated vertical slots is formed in the mounting plate 28 at a spacing from each other with the electrical connectors 26 and thermocouple connectors 30 disposed there between. The mounting plate 28 is fastened to a mounting bracket 34 (see also FIG. 1) by a pair 36 of shoulder bolts extending through each of the slots 32 and threadedly received in mounting bracket 34. Each of the elongated vertical slots 32 has a selected width w which is wider than the shoulder of the mounting bolts 36 to permit the upper mounting plate 28 to slide vertically along the mounting shoulder bolts 36 with respect to mounting bracket 34 and upper die mold half 12. The width w of the slots 32 are about 0.3" wider than the shoulder mounting bolts 36; this additional width also permits the upper mounting plate 28 and the electrical connectors 26 and 30 mounted thereon to move about ±0.125"0 in the horizontal plane to permit docking of the die mold 10 with the docking or pre-heat station 21 as best shown in FIGS. 2 and 3. Mounting bracket 34 is attached to the upper die mold adapter plate 11 by suitable fasteners (not shown in the figures).

The electrical connectors or plugs 26 and the thermocouple connectors 30 are connected to the upper die mold half 12 by suitable conductors 40 as shown in FIGS. 1 and 2. The connectors 26 and 30, the mounting plate 28, the mounting bracket 34 and the insulation of conductors 40 are preferably made from materials which are resistant to the high heat encountered during a molding operation.

A lower electrical connector 42 and thermocouple connectors 44, as shown in FIGS. 1 and 4, are mounted to a lower mounting plate 46, for supplying electrical power to lower die mold half 16 and for controlling the heating of lower die mold half 16, respectively. A pair of electrical connectors 42 and a pair of thermocouple connectors 44 are shown in FIG. 4; however, those skilled in the art will note that fewer or more electrical connectors 42 and thermocouple connectors 44 may be required depending upon the heating requirements and the distribution of the heating elements and thermocouples within the die mold half 16.

Figure 6:
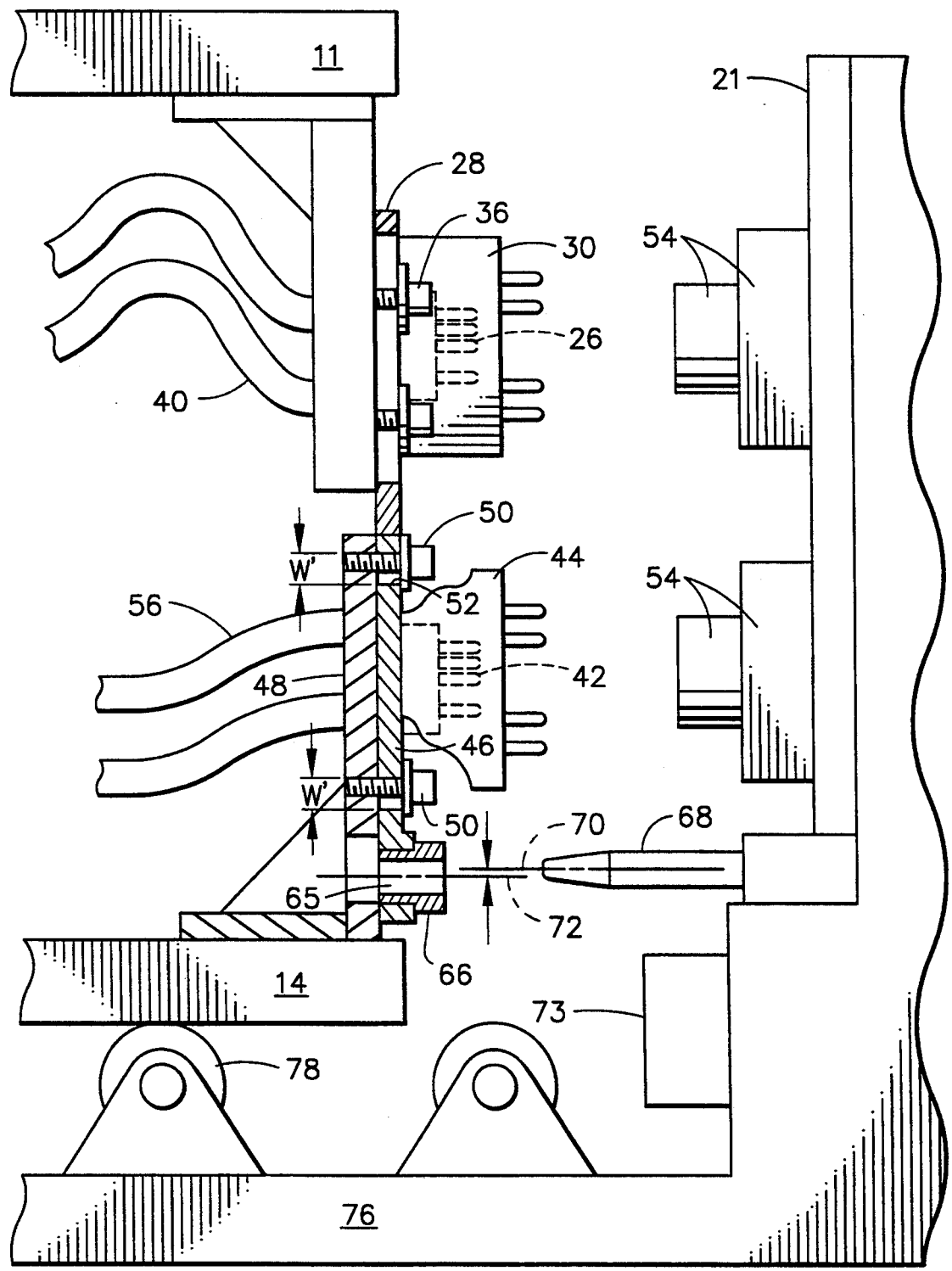
FIG. 6 is a detailed side elevation view of the die mold connectors in accordance with the present invention before docking with the pre-heat station.
Figure 7:
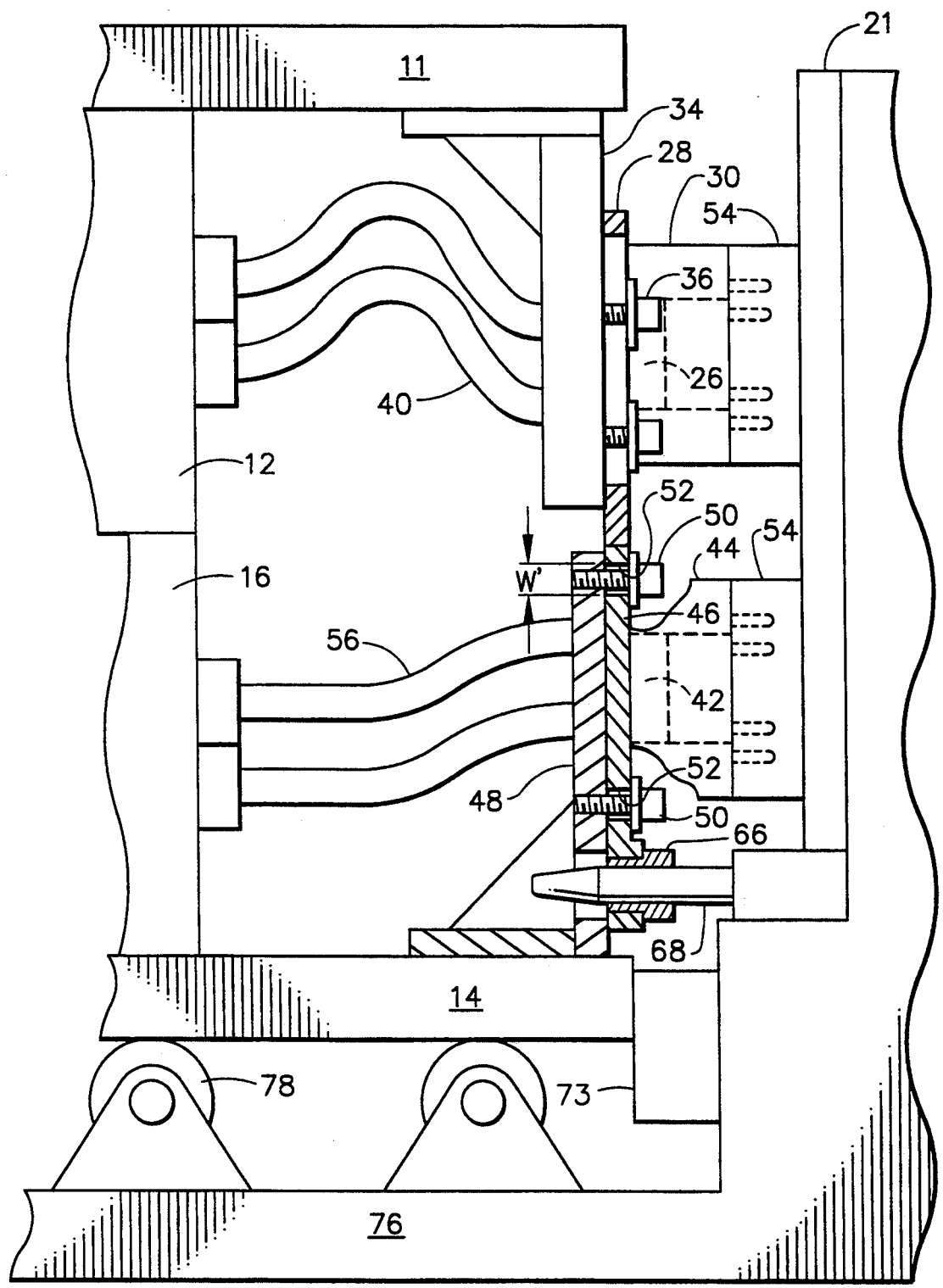
FIG. 7 is a detailed side elevation view of the die mold connectors in accordance with the present invention showing the die mold connectors coupled to the pre-heat station.

The lower mounting plate 46 is mounted to a lower mounting bracket 48, and mounting bracket 48 is in turn mounted to the lower die adapter plate 14 by suitable fasteners (not shown). The lower mounting plate 46 is mounted to lower mounting bracket 48 by a plurality of shoulder bolts 50, preferably four shoulder bolts 50 disposed substantially in quadrature relative to one another, as best shown in FIG. 4. The mounting holes 52 formed in mounting plate 46 through which shoulder bolts 50 are received are a selected width w' which is larger than the diameter of the mounting shoulder bolts 50. The selected width w' is about 0.30" wider than the diameter of hole 50 to allow about ±0.125" of docketing tolerance or movement of the lower mounting plate 46 in any direction from a position in which the centerlines of shoulder bolts 50 are aligned within the centerlines of the mounting holes 52. This permits slight movement of the lower mounting plate 46 and the electrical and thermocouple connectors 42 and 44 mounted thereon to permit alignment with mating connectors 54 on the docking or pre-heat station 21 as best shown in FIGS. 6 and 7. A plurality 56 of electrical conductors interconnects electrical and thermocouple connectors 42 and 44 to lower die mold half 16 to supply electrical power to die mold half 16 and to permit control of the mold heating during a molding operation.

Figure 5:
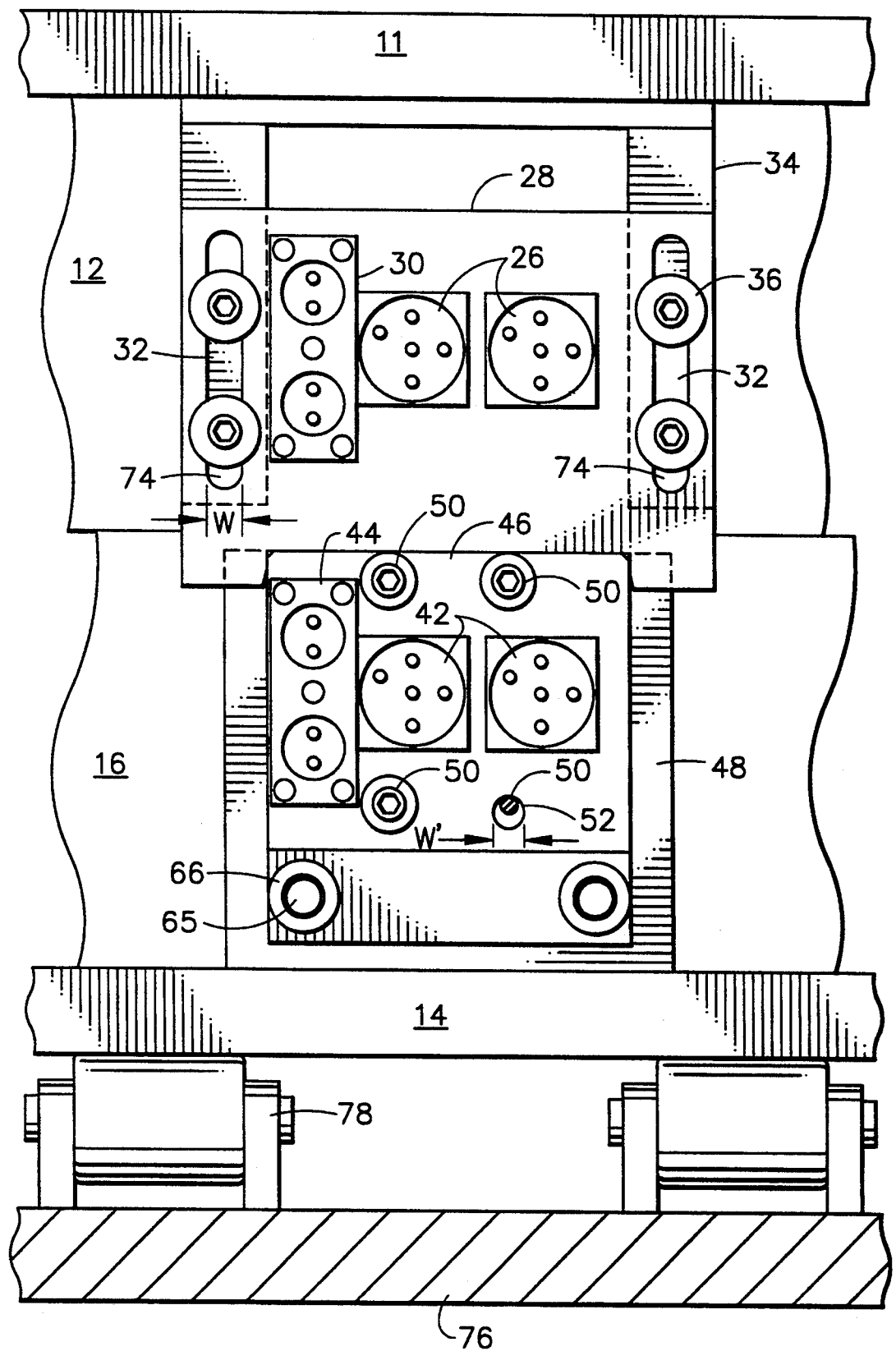
FIG. 5 is a detailed end elevation view showing the electrical connectors in an interlocked operating position for docking with a pre-heat station to perform a molding operation.

In accordance with the present invention, as shown in FIGS. 4 and 5, upper mounting plate 28 has a recess 58 formed therein in a bottom edge 60 thereof and lower mounting plate 46 has a top edge 62 which is shaped to matingly fit within the upper mounting plate recess 58 when the upper die half 12 is in the second position for molding a workpiece as shown in FIG. 5. In this position, the upper mounting plate 28 is interlocked with lower mounting plate 46 to cause the plates 28 and 46 and the upper and lower electrical connectors 26 and 42 and the upper and lower thermocouple connectors 30 and 44 to move in cooperation with each other to permit alignment of the connectors with mating connectors 54 mounted on the pre-heat station 21. The opposite interior sides 63 of recess 58 may be beveled and the opposite end corners 64 of top edge 62 may be chamfered to facility guiding the top edge 62 into the recess 58 to interlock the upper and lower mounting plates 28 and 46 when the upper die half 12 is lowered to the second or operating position for docking with pre-heat station 21.

Referring to FIGS. 2 and 4, lower mounting plate 46 has a pair of guide holes 65 formed therein and a pair of guide bushings 66 disposed in each guide hole 65 for receipt of tapered alignment or guide pins 68 mounted on the pre-heat station 21. Referring now to FIG. 6, in accordance with the present invention, the centerlines 70 of tapered guide pins 68 are preferably offset above the centerlines 72 of guide bushings 66 to cause the lower mounting plate 46 and the upper mounting plate 28 to move upwardly and laterally, if necessary, such that the mounting shoulder bolts 50 will be substantially in the center of the mounting holes 52 of the lower mounting plate 46 before the connectors 26 and 42 interconnect with the mating connectors 54 mounted on docking station 21. Guide pins 68 have a predetermined length such that they are received by guide bushings 66 to cause movement of the upper and lower mounting plates 28 and 46 to cause alignment of the electrical connectors 26 and 42 and the thermocouple connectors 30 and 44 with the mating receiving connectors 54 before the respective connectors come into contact with one another during docking of the die mold 10 to the station 21. Pre-heat station 21 preferably includes a bumper or stop 73 to prevent hard impact of the die mold 10 with the station 21 which could potentially damage the connectors and other components.

Referring back to FIG. 5, in accordance with the present invention, elongated vertical slots 32 have a predetermined length to permit some compression of the workpiece during a molding operation. When a charge or unmolded workpiece is initially placed within the die mold 10 and the upper die half 12 is lowered to its operating position, the upper and lower die mold halves 12 and 16 may still be at a spacing from one another relative to their spacing after the completion of a molding process. The additional length 74 of elongated slots 32 permits the upper die mold half 12 to move downwardly and compress the workpiece being molded between the die mold halves 12 and 16. This compression during a molding operation may be as much as 1" or more.

It should, therefore, be apparent from the foregoing that the electrical connectors 26 and 42 and the thermocouple connectors 30 and 44 are capable of independent movement from the upper and lower adapter plates 11 and 14 and the die halves 12 and 16 to permit alignment and docking with the mating connectors 54 on the pre-heat station 21, when the die mold 10 is advanced toward the pre-heat station 21, and the upper die mold half 12 and the upper adapter plate 11 can move independently of the upper mounting plate 28 and the connectors 26 and 30 mounted thereon to permit compression of the mold 10 during a molding operation.

The pre-heat station 21 preferably includes a conveyor arrangement 76, such as a plurality 78 of bearing mounted rollers. The roller bearing conveyor assembly 76 permits movement of the die mold 10 into a docking position with pre-heat station 21 as shown in FIGS. 3 and 7 when upper mold half 12 is lowered into its operating position for performing a molding operation. The die mold 10 may be moved into the docked position with pre-heat station 21 by a mechanical ram 80 or a similar type mechanical arrangement for moving the die mold 10 in and out of the docked position with station 21. After preheating, the die mold is preferably moved to a press station (not shown) where the adapter plates 11 and 14 and mold halves 12 and 16 are forced together to form the workpiece.

While the present invention has been described with respect to the automatic, self-aligning electrical connection of a die mold manufacturing device to a preheat station, those skilled in the art will recognize that the features illustrated and described herein may be applied to other types of automated manufacturing devices or systems where automatic coupling of a workpiece receptacle to an external source or process inputs, such as pneumatics, hydraulics or the like, and automatic connection to the control mechanisms for these inputs are desired.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it will be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A manufacturing device for holding an unfinished workpiece and moving the workpiece to a docking station for performance of a manufacturing operation on the workpiece, said manufacturing device comprising:

a receptacle for receiving and holding the unfinished workpiece;

connector means for coupling said receptacle to at least one process input via the docking station wherein said at least one process input is at least one of electrical energy, pneumatics and hydraulics;

means for automatically aligning said connector means for automatic, self attachment to a mating connector mounted on the docking station when said receptacle is advanced toward the docking station;

a frame, said receptacle being mounted to said frame; and means for movably attaching said connector means to said frame, said connector means being independently moveable relative to said frame and said receptacle to permit alignment with the mating connector on the docking station for interconnection of said connectors.

2. The device of claim 1, wherein said attaching means comprises:

a mounting bracket attached to said frame;

a mounting plate, said connector means being mounted to said mounting plate; and means for movably attaching said mounting plate to said mounting bracket, said mounting plate being moveable relative to said mounting bracket, said frame and said receptacle to permit independent alignment of said connector means with the mating connector for attachment thereto.

3. The device of claim 2, wherein said attaching means comprises a plurality of fasteners each extending through an opening formed in said mounting plate and attached to said mounting bracket, each of said openings being larger than said fastener extending therethrough to permit movement of said mounting plate relative to said mounting bracket for alignment of said connector means with the mating connector.

4. The device of claim 2, wherein said aligning means comprises:

a plurality of guide bushings formed in one of said mounting plate and the docking station; and a plurality of elongated alignment pins mounted on the other of said mounting plate and the docking station, each alignment pin being positioned to be received by a respective one of said plurality of guide bushings.

5. A manufacturing device for holding an unfinished workpiece and moving the workpiece to a docking station for performance of a manufacturing operation on the workpiece, said manufacturing device comprising:

a receptacle for receiving and holding the unfinished workpiece;

connector means for coupling said receptacle to at least one process input via the docking station;

means for automatically aligning said connector means for automatic, self-attachment to a mating connector mounted on the docking station when said receptacle is advanced toward the docking station;

a frame, said receptacle being mounted to said frame; and means for movably attaching said connector means to said frame, said connector means being independently movable relative to said frame and said receptacle to permit alignment with the mating connector on the docking station for interconnection of said connectors;

wherein said attaching means comprises:

a mounting bracket attached to said frame;

a mounting plate, said connector means being mounted to said mounting plate;

means for movably attaching said mounting plate to said mounting bracket, said mounting plate being moveable relative to said mounting bracket, said frame and said receptacle to permit independent alignment of said connector means with the mating connector for attachment thereto;

a plurality of fasteners each extending through an opening formed in said mounting plate and attached to said mounting bracket, each of said openings being larger than said fastener extending therethrough to permit movement of said mounting plate relative to said mounting bracket for alignment of said connector means with the mating connector;

wherein said aligning means comprises:

a plurality of guide bushings formed in one of said mounting plate and the docking station; and a plurality of elongated alignment pins mounted on the other of said mounting plate and the docking station, each alignment pin being positioned to be received by a respective one of said plurality of guide bushings.

* * * * *